Figure 1:
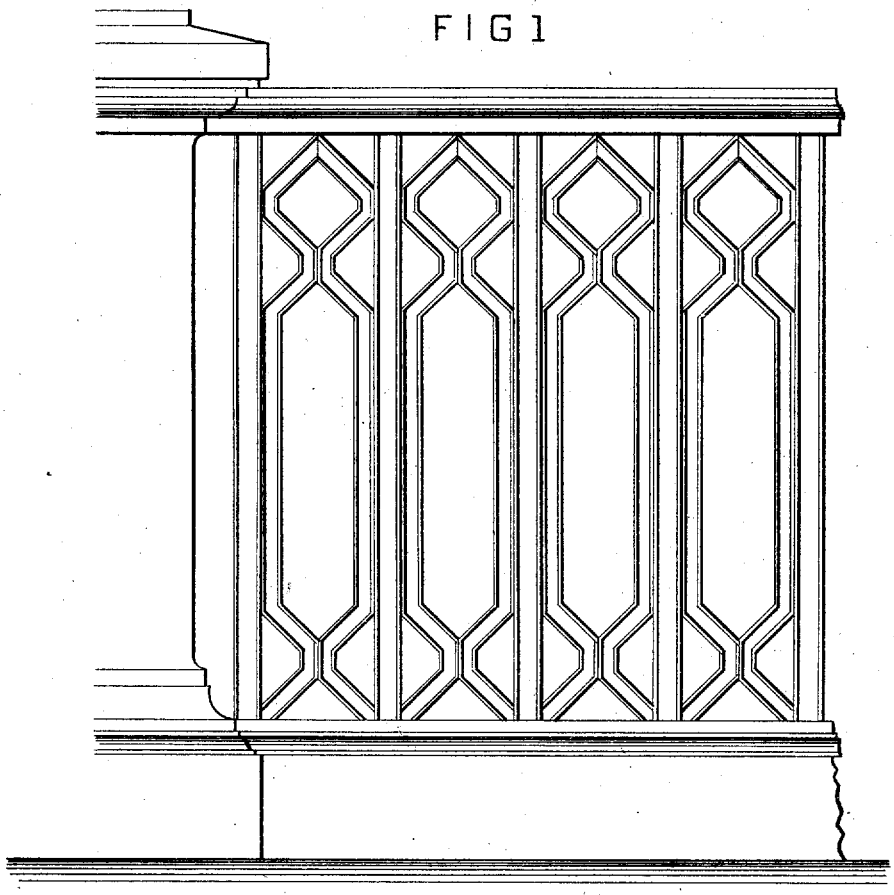

5 Sheets--Sheet 1.

S. SELLERS & M. M. MANLY.

Balusters for Iron Bridge Railings

No. 5,730. Reissued Jan. 13, 1874.

WITNESSES.
Warren R. Lewis
Robt. P. Manly

INVENTORS.
2 M. M. Manly
1 Saml Sellers

AM. PHOTO-LITHOGRAPHIC Co. N.Y. (OSBORNE'S PROCESS)

5 Sheets--Sheet 2.

S. SELLERS & M. M. MANLY.

Balusters for Iron Bridge Railings.

No. 5,730.

Reissued Jan. 13, 1874.

WITNESSES-
Robt P. Manly
Watson R. Lewis

INVENTORS-
2 M. M. Manly
1 Saml Sellers

AM. PHOTO-LITHOGRAPHIC Co. N.Y. (OSBORNE'S PROCESS)

5 Sheets--Sheet 3.

S. SELLERS & M. M. MANLY.

Balusters for Iron Bridge Railings.

No. 5,730. Reissued Jan. 13, 1874.

WITNESSES.

Watson R. Lewis

Robt P. Manly

INVENTORS.

M. M. Manly

Saml Sellers

AM. PHOTO-LITHOGRAPHIC CO. N.Y. (OSBORNE'S PROCESS)

S. SELLERS & M. M. MANLY.

Balusters for Iron Bridge Railings.

No. 5,730. Reissued Jan. 13, 1874.

WITNESSES.
Watson R. Lewis
Robt. P. Manly

INVENTORS.
2 M. M. Manly
1 Saml Sellers

AM. PHOTO-LITHOGRAPHIC Co. N.Y. (OSBORNE'S PROCESS)

5 Sheets--Sheet 5.

S. SELLERS & M. M. MANLY.

Balusters for Iron Bridge Railings.

No. 5,730. Reissued Jan. 13, 1874.

WITNESSES.
Robt P. Manly
W. M. Sailer

INVENTORS.
2 M. M. Manly
1 Saml Sellers

AM. PHOTO-LITHOGRAPHIC CO. N.Y. (OSBORNE'S PROCESS)

UNITED STATES PATENT OFFICE.

SAMUEL SELLERS AND MARCUS M. MANLY, OF PHILADELPHIA, PA.

IMPROVEMENT IN BALUSTERS FOR IRON BRIDGE-RAILINGS.

Specification forming part of Letters Patent No. 138,049, dated April 22, 1873; reissue No. 5,730, dated January 13, 1874; application filed November 8, 1873.

*To all whom it may concern:*

Be it known that we, SAMUEL SELLERS and MARCUS M. MANLY, both of the city of Philadelphia, State of Pennsylvania, did invent certain new and useful Improvements in Wrought-Iron Railings for Bridges and other purposes; and our invention relates to that portion of the railing occupying the space between the bottom and top bars, or the base and hand-rail of the railing, which we style "balusters;" and we hereby declare the following to be a full, clear, and exact description of the same, reference being had to the annexed drawings making a part thereof.

Our invention consists of a new article of manufacture, viz., the balusters of bridges and other railings made of rolled shell-moldings and of flanged wrought-iron or steel; also, of such balusters made of rolled, flanged, channel, grooved, or hollow iron or steel, or rolled iron or steel moldings bent angularly, curved, or arranged so as to form various patterns and designs; also, of such last-named balusters placed and arranged side by side, adjoining and touching one another, between the upper and lower horizontal rails of a bridge or other railing; also, of a balustrade composed of balusters constructed in like manner, and secured to one another by rivets passing through the adjoining flanges or edges of contiguous balusters; also, of balusters constructed as described, and secured to the upper or lower rail, or to both, by means of passing the ends of the flanges through such rails, part of the web having been cut out, and clinching them by turning them down on the opposite side.

Figure 2:
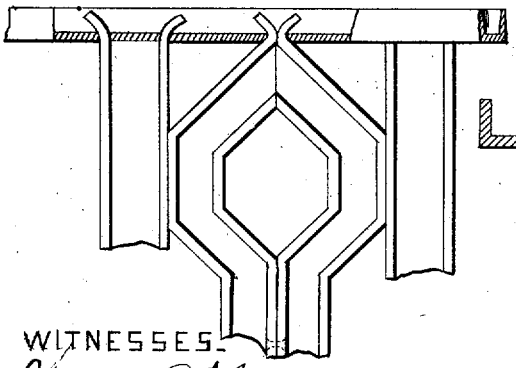
Figure 11:
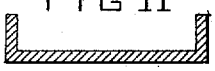
Figure 3:
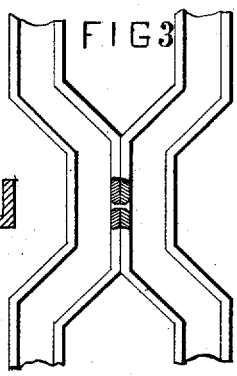
Figure 4:
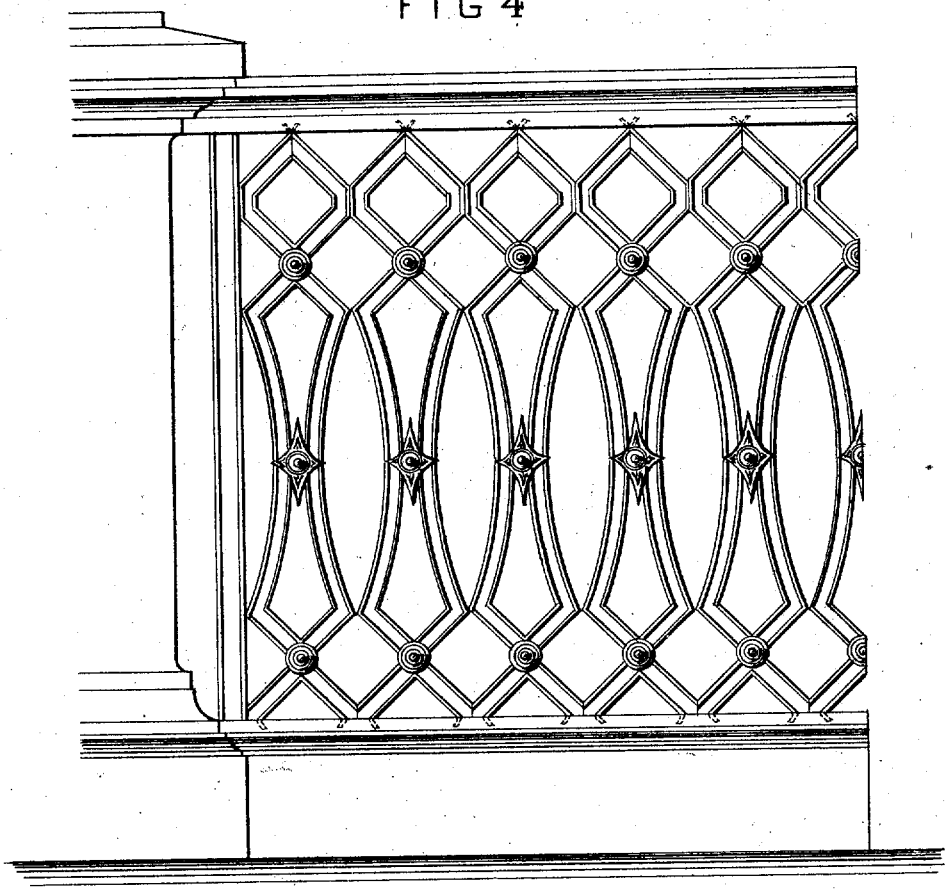
Figure 7:
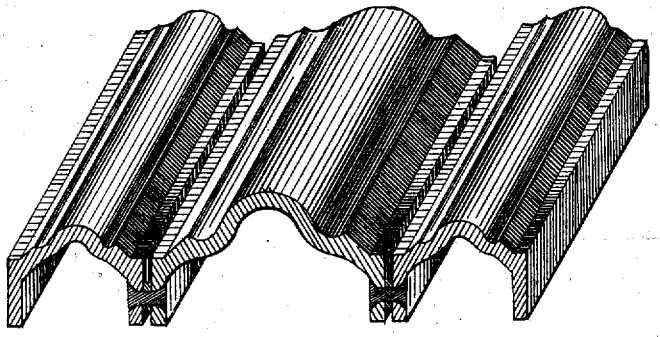
Figure 5:
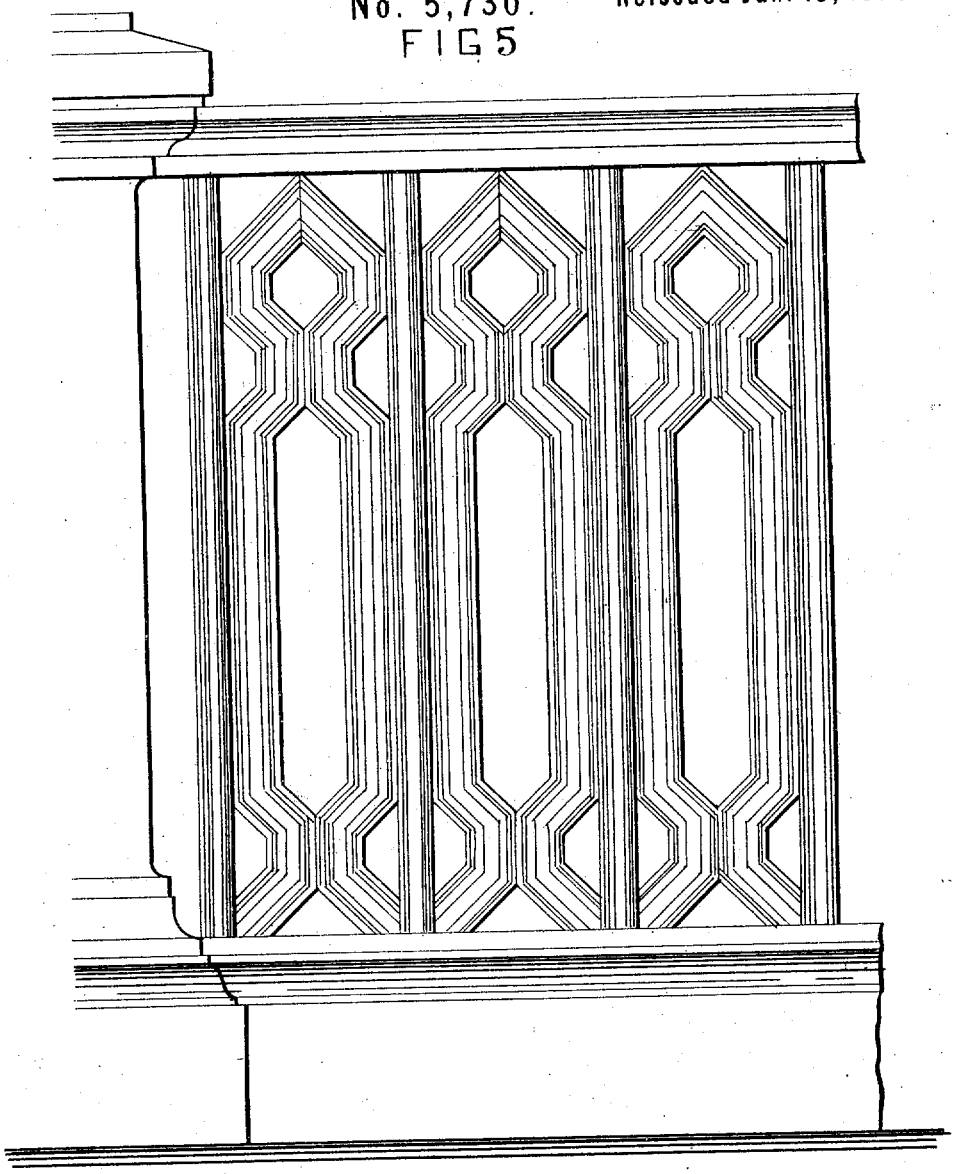
Figure 6:
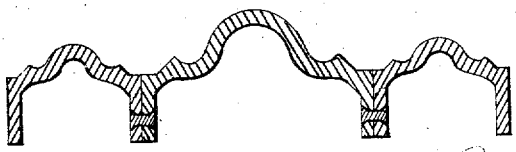
Figure 8:
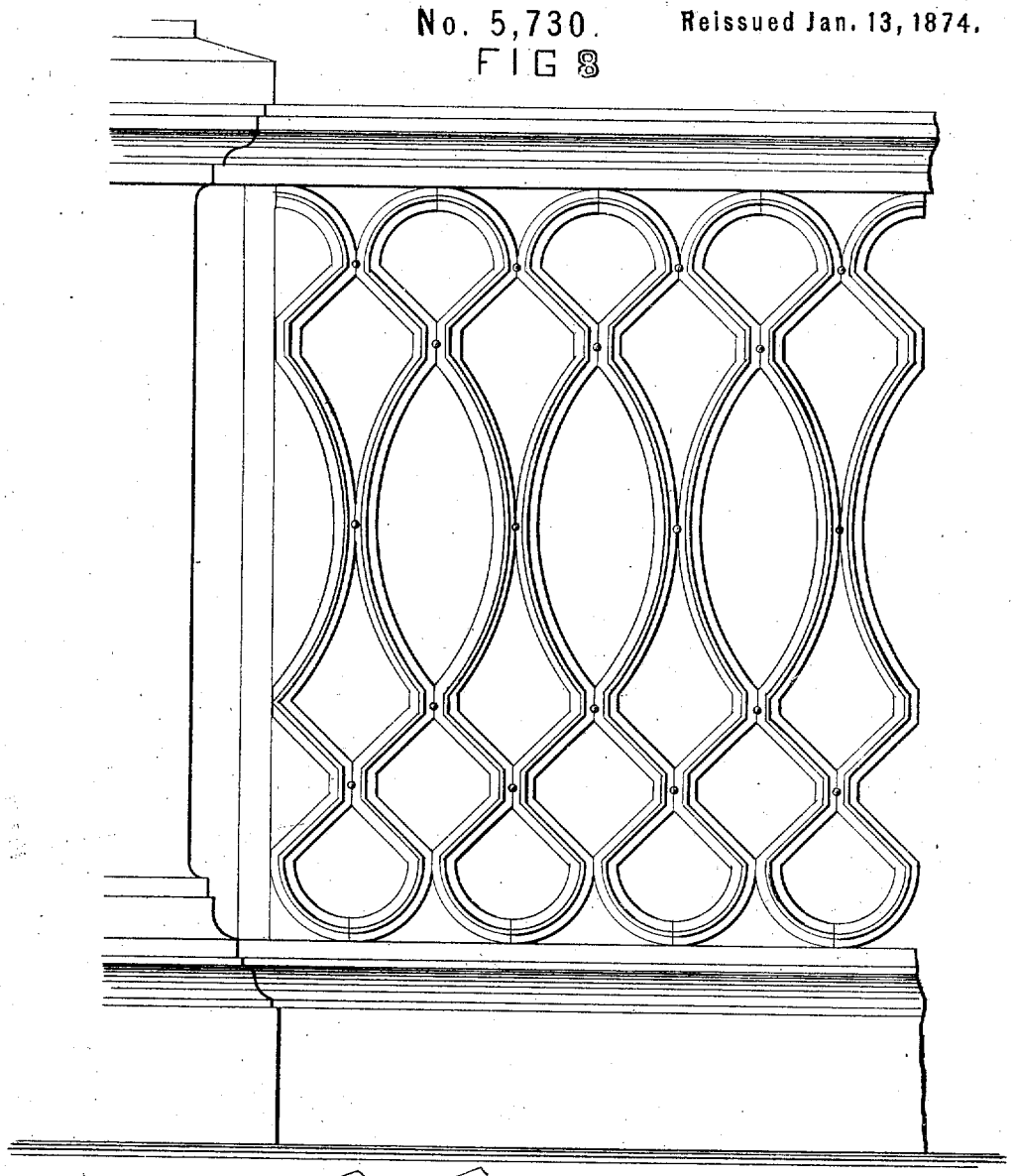
Figure 9:
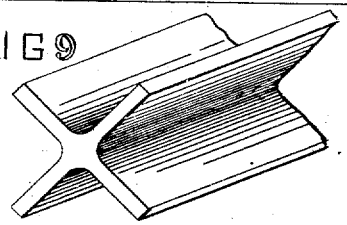
Figure 10:
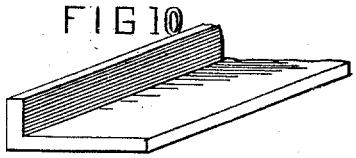
Figure 12:
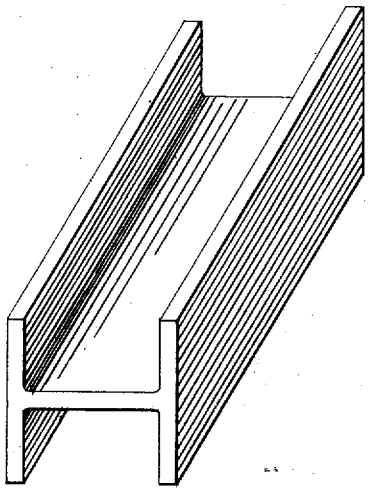
Figure 13:
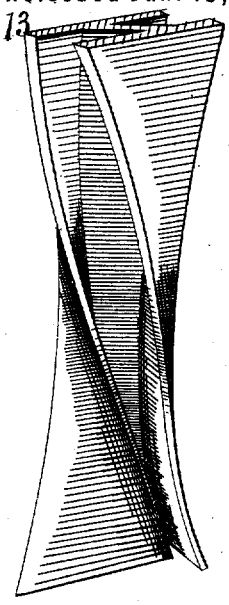
Figure 16:
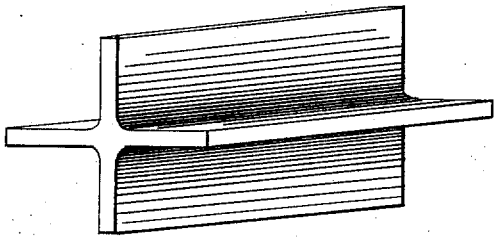
Figure 14:
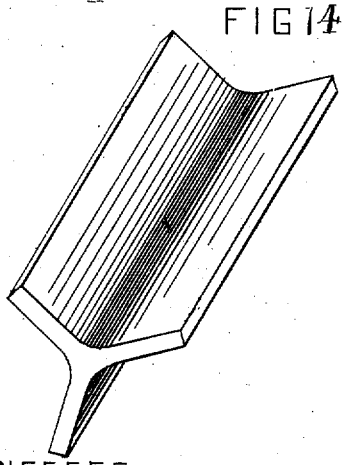
Figure 15:
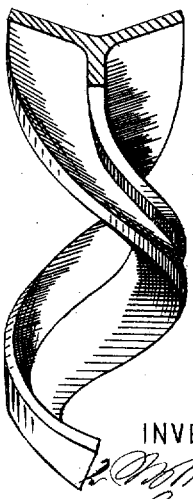

In the drawings, Figures 1, 4, 5, and 8 are side elevations, showing a variety of forms in which rolled moldings and flanged iron or steel may be made to form balusters. The longest parts of Figs. 1 and 5, in their respective figures, join each other, thus forming a solid ornamental panel. Figs. 2 and 3 are enlarged and broken views, showing the mode of fastening the moldings and flanged iron together, and to the top and bottom bars. Figs. 4 and 8 show another mode of fastening, by means of cast or swaged rosettes or other ornament. Fig. 7 is a perspective view of molding forming the balusters, with a metal strip between them. Fig. 9 is a perspective view of flanged iron used for balusters of Fig. 8. Fig. 11 is a cross-section of flanged iron or steel forming the balusters of Figs. 1 and 4. Fig. 6 is a cross-section of three shell-molding balusters riveted together; Figs. 10, 12, 13, 14, 15, and 16, various forms of flanged and angled wrought-iron or steel, which may be used for the balusters. Fig. 13 shows a twisted strip, and Fig. 14 a spiral strip.

Heretofore, when wrought-iron has been used to form this part of a railing, it has been used in the solid bars, (usually round,) not capable of being used so as to present a heavy and ornamental appearance without increasing the weight very much.

The lighter weight of our railing gives it increased value on bridges by its diminished strain on the superstructure.

To enable others who are skilled in the art to make and use our invention, we will describe its construction.

The molding or flanged, channel, grooved, or hollow iron or steel being rolled of the required size and form, a strip is taken of sufficient length to form the various angles and curves in the desired pattern, as shown in Figs. 1, 4, 5, and 8, and to extend from the bottom bar to the top bar. After receiving the required shape by heating and bending, clinches are made on top and bottom by cutting away a part of the web metal at each end, leaving the flat sides or flanges projecting like a fork, as shown in Fig. 2; then holes are punched in the flat sides or flanges for rivets to secure the parts together, as in Fig. 3. The strips are then arranged to form the panel, inserting the clinches in holes in the top and bottom bars previously punched; then the sides of the separate strips are riveted together, as in Fig. 3, and their ends clinched, as in Fig. 2. Where the strips are fastened by means of rosettes or ornaments, the usual mode is adopted of riveting the rosettes together.

We do not confine ourselves to the various arrangements or forms shown, as the forms in which they may be combined are innumerable.

Having thus described our invention, what we claim as new, and desire to secure by Letters Patent, is—

1. As a new article of manufacture, the balusters of bridges and other railings, made of rolled shell-moldings and of rolled flanged iron or steel, substantially as described.

2. The balusters of bridges, fences, and other railings, made of rolled flanged iron or steel, or of rolled, channel, grooved, or hollow iron or steel, or of rolled iron or steel moldings, bent angularly, curved, or arranged so as to form various patterns and designs, substantially as described.

3. The balusters of bridges, fences, and other railings, made of rolled flanged iron or steel, or of rolled, channel, grooved, or hollow iron or steel, or of rolled iron or steel moldings placed or arranged side by side, their flanges adjoining and touching one another, between the upper and lower horizontal rails of a bridge or other railing, substantially as described.

4. Balustrades of bridges, fences, and other railings, composed of balusters constructed of rolled, flanged iron or steel, or of rolled, channel, grooved, or hollow iron or steel, or of rolled iron or steel moldings, secured to one another by rivets passing through the adjoining flanges or edges of contiguous balusters, substantially as described.

5. The balusters of bridges, fences, and other railings, made of rolled flanged iron or steel, or of rolled, channel, grooved, or hollow iron or steel, or of rolled iron or steel moldings, secured to the upper or lower rail, or to both, by means of passing the ends of the flanges through said rails and clinching them by turning them down on the other side, substantially as described.

SAML. SELLERS.
M. M. MANLY.

Witnesses:
ALBERT E. ZACHERLE,
ANDREW ZANE, Jr.